United States Patent
Bohli et al.

(10) Patent No.: US 10,873,631 B2
(45) Date of Patent: *Dec. 22, 2020

(54) METHOD FOR STORING DATA IN A CLOUD AND NETWORK FOR CARRYING OUT THE METHOD

(71) Applicant: NEC Corporation, Tokyo (JP)

(72) Inventors: Jens-Matthias Bohli, Leimen (DE); Ghassan Karame, Heidelberg (DE); Frederik Armknecht, Worms (DE)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/579,897

(22) Filed: Sep. 24, 2019

(65) Prior Publication Data
US 2020/0021656 A1  Jan. 16, 2020

Related U.S. Application Data

(63) Continuation of application No. 15/572,795, filed as application No. PCT/EP2015/060641 on May 13, 2015, now Pat. No. 10,498,819.

(51) Int. Cl.
*H04L 29/06* (2006.01)
*H04L 29/08* (2006.01)
(Continued)

(52) U.S. Cl.
CPC .......... *H04L 67/1097* (2013.01); *G06F 3/065* (2013.01); *G06F 3/0619* (2013.01); *G06F 11/2056* (2013.01); *H04L 9/3271* (2013.01); *H04L 63/123* (2013.01); *H04L 67/06* (2013.01); *H04L 67/1095* (2013.01); *H04L 9/008* (2013.01)

(58) Field of Classification Search
CPC .... G06F 3/0619; G06F 3/065; G06F 11/2056; H04L 67/1095
See application file for complete search history.

(56) References Cited

U.S. PATENT DOCUMENTS

| 8,346,742 B1 | 1/2013 | Juels et al. |
| 2013/0198854 A1 | 8/2013 | Erway et al. |

(Continued)

OTHER PUBLICATIONS

Armknecht et al., "Mirror: Enabling Proofs of Data Replication and Retrievability in the Cloud", pp. 1-17 (Year: 2016).*

(Continued)

*Primary Examiner* — Thaddeus J Plecha
(74) *Attorney, Agent, or Firm* — Leydig, Voit & Mayer, Ltd.

(57) ABSTRACT

A method for storing data in a cloud includes receiving at least one data file to be stored together with a predefined number t of replicas of the at least one data file within the cloud, at least one authentication tag corresponding to the at least one data file and t functions that are configurable to take at least a predefined time to compute; storing the at least one data file within the cloud; computing t solutions of the t functions within the cloud; generating the t replicas of the at least one data file based on the t solutions of the t functions and the at least one data file within the cloud, wherein each of the t functions is used for at least one of the t replicas of the at least one data file; and storing the t replicas within the cloud.

20 Claims, 1 Drawing Sheet

(51) Int. Cl.
*G06F 3/06* (2006.01)
*G06F 11/20* (2006.01)
*H04L 9/32* (2006.01)
*H04L 9/00* (2006.01)

(56) References Cited

U.S. PATENT DOCUMENTS

2015/0288703 A1 10/2015 Yoshino et al.
2017/0243012 A1 8/2017 Karame et al.

OTHER PUBLICATIONS

Reiter et al., "Making Contribution-Aware Peer-Assisted Content Distribution Robust to Collusion Using Bandwidth Puzzles", 30 pages (Year: 2009).*
Vasilopoulos et al., "PORTOS: Proof of Data Reliability for Real-World Distributed Outsourced Storage", pp. 173-186 (Year: 2019).*
Barman, "PoR2—Proofs of Retrievability and Redundancy", 74 pages (Year: 2015).*
Mukundan Raghul et al: "Efficient integrity verification of replicated data in cloud using homomorphic encryption", Distributed and Parallel Databases, Kluwer, NL, vol. 32, No. 4, Jun. 24, 2014 (Jun. 24, 2014), pp. 507-534, XP035388814.
Ayad F Barsoum et al: "Provable Possession and Replication of Data over Cloud Servers", Oct. 30, 2010 (Oct. 30, 2010), XP055240428, p. 4.
Rivest R L et al: "Time lock puzzles and timed release Crypto", Internet Citation, Mar. 10, 1996 (Mar. 10, 1996), XP002327209.
Kumar et al., "Data integrity proofs in cloud storage", 4 pages (Year: 2011).
Curtmola et al., "MR-PDP: Multiple-Replica Provable Data Possession", pp. 411-420 (Year: 2008).
Bowers et al., "How to Tell if Your Cloud Files Are Vulnerable to Drive Crashes", pp. 501-514 (Year: 2011).
Van Dijk et al., "Hourglass Schemes: How to Prove that Cloud Files Are Encrypted", pp. 265-280 (Year: 2012).
Erway et al. "Dynamic Provable Data Possession", 29 pages (Year: 2015).
Etemad et al., "Transparent, Distributed, and Replicated Dynamic Provable Data Possession", pp. 1-18 (Year: 2013).

* cited by examiner

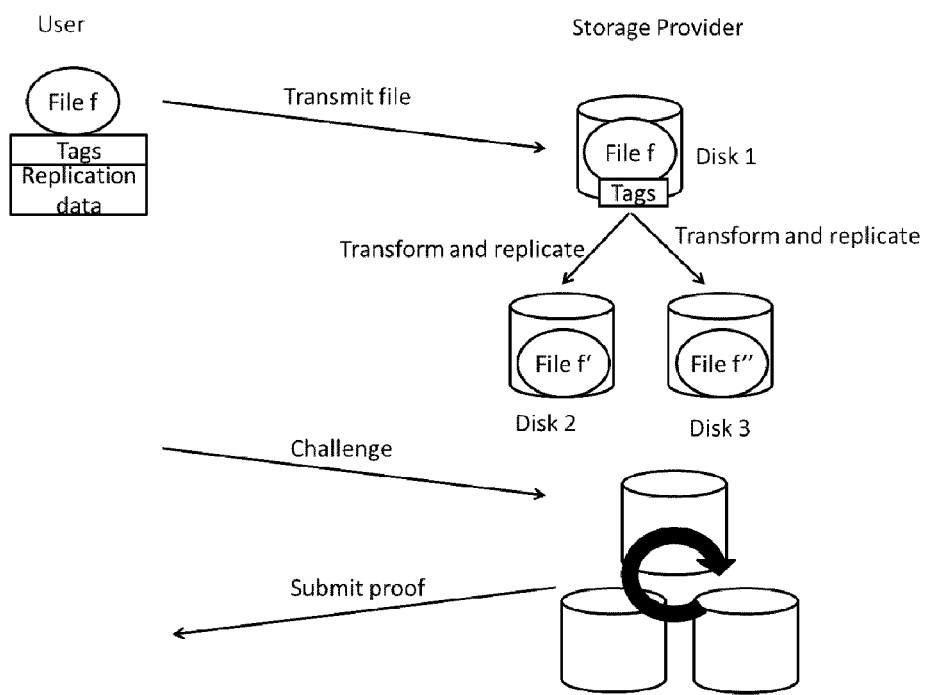

METHOD FOR STORING DATA IN A CLOUD AND NETWORK FOR CARRYING OUT THE METHOD

CROSS-REFERENCE TO PRIOR APPLICATIONS

This application is continuation of U.S. application Ser. No. 15/572,795, filed on Nov. 9, 2017, which is a U.S. National Stage Application under 35 U.S.C. § 371 of International Application No. PCT/EP2015/060641 filed on May 13, 2015, both of which are hereby incorporated by reference herein. The International Application was published in English on Nov. 17, 2016 as WO 2016/180495 A1 under PCT Article 21(2).

FIELD

The present invention relates to a method for storing data in a cloud. Further, the present invention relates to a network for carrying out the method for storing data in a cloud.

BACKGROUND

Cloud services have become an integral part of our lives as they promise a convenient means for users to access and store their data from multiple devices. The cloud also promises a cost-effective alternative for small and medium enterprises to offer their services without the need for huge upfront investments, e.g., to ensure high service availability.

Currently, most cloud storage services guarantee service and data availability in their Service Level Agreements, SLAs. Availability is typically ensured by means of full replication. Replicas are typically stored onto different servers, thus ensuring data availability in spite of server failure. Currently, storage services such as Amazon S3 and Google FS provide such resiliency against a maximum two concurrent failures; here, users are typically charged according to the required redundancy level.

Nevertheless, none of today's cloud providers accept any liability for data loss in their SLAs. This makes users reluctant when using cloud services due to concerns with respect to the integrity of their outsourced data. To remedy this, the literature features a number of solutions that enable users to remotely verify the integrity of stored data. Examples include Proofs of Retrievability, POR, see Shacham, H., and Waters, B. Compact Proofs of Retrievability, in ASIACRYPT (2008), pp. 90-107, which provide end-clients with the assurance that the data is available in its entirety, and Proofs of Data Possession, PDP, see Ateniese, G., Burns, R. C., Curtmola, R., Herring, J., Kissner, L., Peterson, Z. N. J., and Song, D. X. Provable data possession at untrusted stores, in ACM Conference on Computer and Communications Security (2007), pp. 598-609, which enable a client to verify that its stored data has not undergone any modifications, among others. These schemes have been recently extended to support the remote integrity verification of multi-replicas, MRV, see Curtmola, R., Khan, O., Burns, R. C., and Ateniese, G. MR-PDP: Multiple-Replica Provable Data Possession, in ICDCS (2008), pp. 411-420; MRV enables users to verify that they are getting the value of their money by verifying the replication status and the integrity of their replicated data. All existing MRV solutions share a similar system model, requiring the users themselves to create replicas of their files, appropriately pre-process the replicas, e.g., to create authentication tags, and finally store all processed replicas onto the cloud.

SUMMARY

In an embodiment, the present invention provides a method for storing data in a cloud, the method comprising: receiving at least one data file to be stored together with a predefined number t of replicas of the at least one data file within the cloud, at least one authentication tag corresponding to the at least one data file and t functions that are configurable to take at least a predefined time to compute; storing the at least one data file within the cloud; computing t solutions of the t functions within the cloud; generating the t replicas of the at least one data file based on the t solutions of the t functions and the at least one data file within the cloud, wherein each of the t functions is used for at least one of the t replicas of the at least one data file; and storing the t replicas within the cloud.

BRIEF DESCRIPTION OF THE DRAWINGS

The present invention will be described in even greater detail below based on the exemplary FIGURE. The invention is not limited to the exemplary embodiments. Other features and advantages of various embodiments of the present invention will become apparent by reading the following detailed description with reference to the attached drawing which illustrates the following:

FIG. 1 shows an embodiment of a method for storing data according to the present invention.

DETAILED DESCRIPTION

Existing MRV solutions incur considerable burden on the users, who are required to appropriately pre-process and upload all the replicas. For example, in order to store a 10 GB file with a replication factor of 4, a user has to process and upload almost 40 GB of content. The inventors have recognized that these limitations severely hinder the large-scale integration of MRV techniques in existing clouds.

An aspect of the present invention improves and further develops a method for storing data in a cloud and a network for carrying out this method for providing an easy and secure use of cloud services.

In accordance with an embodiment of the invention, the aforementioned aspect is provided by a method for storing data in a cloud, comprising the following steps:

providing at least one data file to be stored together with a predefined number t of replicas of the at least one data file within the cloud, at least one authentication tag corresponding to the at least one data file and t functions that can be configured to take at least a predefined time to compute;

transmitting the at least one data file, the at least one authentication tag and the t functions to the cloud;

storing the at least one data file within the cloud;

computing t solutions of the t functions within the cloud;

generating the t replicas of the at least one data file based on the t solutions of the t functions and the at least one data file within the cloud, wherein each function is used for at least one replica of the at least one data file; and storing the t replicas within the cloud.

Further, the aforementioned aspect is provided according to another embodiment by a network for carrying out the method for storing data in a cloud, comprising:

a transmitting device for transmitting to the cloud: at least one data file to be stored together with a predefined number t of replicas of the at least one data file within the cloud, at least one authentication tag corresponding to the at least one data file and t functions that can be configured to take at least a predefined time to compute;

a storing device for storing the at least one data file within the cloud;

a computing device for computing t solutions of the t functions within the cloud;

a generating device for generating the t replicas of the at least one data file based on the t solutions of the t functions and the at least one data file within the cloud, wherein each function is used for at least one replica of the at least one data file; and a storing device for storing the t replicas within the cloud.

According to embodiments of the invention it has been recognized that it is possible to generate replicas in a cloud without preprocessing all the replicas prior to transmitting the replicas to the cloud. Concretely, according to the invention only the at least one data file has to be transmitted to the cloud and the generation of replicas will be performed within the cloud under consideration of at least one authentication tag corresponding to the at least one data file. For providing data availability with high reliability the generating of the predefinable number t of replicas is based on t solutions oft functions and the at least one data file within the cloud, wherein each function corresponds to or is used for at least one replica of the at least one data file. The t functions can be configured to take at least a predefined time to compute, wherein this time can be adapted to the time necessary for generating the replicas. The inventive method for storing data in a cloud provides a basis for an efficient verification process regarding integrity for all replicas. Thus, an easy and secure use of cloud services is provided by the claimed invention.

According to an embodiment of the invention the t functions each can be not parallelizable. This ensures that these functions need essentially the predefined time for being computed. The functions can not significantly profit from additional hardware within the cloud. Alternatively or additionally the t functions can comprise exponent E. Such a function will take a certain time to compute, wherein the required time can be adapted by the size of the parameter E. Alternatively or additionally the function can comprise a one-way function, such as a one-way hash function.

According to a further embodiment the t functions can be time-lock puzzles Such a time-lock puzzle is a function that can be configured to take at least a certain time to compute. Typically such functions can not be parallelized. Such time-lock puzzles can be used during the generation of replicas.

According to a further embodiment the at least one or each puzzle can be based on exponentiation modulo a composite number or on RSA, Rivest Shamir Adleman.

Additionally or alternatively at least one or each puzzle can exhibit a trapdoor based on the Euler totient function. The use of puzzles based on RSA and exhibiting a trapdoor based on the Euler totient function enables users to verify the puzzle efficiently, irrespective of the puzzle difficulty.

According to a further embodiment at least one or each puzzle can be based on finding a pre-image of a one-way function.

According to a further embodiment at least one or each puzzle can be based on inverting a one-way function, such as a one-way hash function. Additionally or alternatively the one-way function can be inverted by creating random nonces and evaluating the one-way function until a solution of the puzzle is found.

The t functions can be constructed in different ways. According to an embodiment the functions can be constructed that each solution has the same size of the at least one data file. Alternatively or additionally each solution can represent a replica of the at least one data file. Alternatively or additionally the functions can be constructed in a way that each solution can be efficiently verified.

Within a further embodiment a processed file comprising the at least one data file and the at least one authentication tag can be provided and transmitted to the cloud. Thus, a pair of data file and authentication tag can be provided for simply storing data in the cloud.

For proving data replication in the cloud a challenge can be issued for blocks contained across all replicas. Within such an embodiment the cloud can compute a response to the challenge under consideration of the at least one authentication tag and the data file and replicas stored. Such a response can be transmitted to the user for verification.

Within a further embodiment the time it takes for the cloud to respond can be measured. Usually this time must be smaller than the expected time to compute the function. Otherwise, the user will not accept the response.

Within a further embodiment the response can be verified under use of a trapdoor function to ensure that all replicas are stored. This provides a simple and secure proving of data replication in the cloud.

According to embodiments of the invention proof of integrity for at least one or all replicas can be performed by means of a challenge-response protocol, e.g. according to the above mentioned challenge-response proceeding.

According to further embodiments of the invention proof of integrity for at least one or all replicas can be performed by use of a homomorphic nature of the authentication tag or authentication tags. A compact challenge-response protocol can be provided on the basis of this homomorphic nature of the authentication tag or authentication tags.

An embodiment of the present invention provides a novel solution for storing data in a cloud which goes beyond existing MRV solutions and enables users to efficiently verify the integrity of all their data replicas. Notably, according to an embodiment of the present invention, users need to process/upload their original files only once irrespective of the replication undergone by their data. This solution nevertheless provides comparable security to existing provably secure MRV schemes.

Various advantages of embodiments of the invention can be summarized as follows:

Embodiments of the construction of file tags use homomorphic authentication codes in order to produce compact homomorphic proofs, allowing to batch the verification of blocks pertaining to multiple replicas.

According to state-of-the-art, the user could create the required t replicas of his files, and construct the corresponding verification tags for each replica such that the proofs generated by the cloud for each replica can be combined in a way similar to Curtmola, R., Khan, O., Burns, R. C., and Ateniese, G. MR-PDP: Multiple-Replica Provable Data Possession, in ICDCS (2008), pp. 411-420. As mentioned earlier, this alternative incurs considerable overhead on the users as it requires them to upload and pre-process all the replicas.

On the other hand, a naive solution where the cloud provider creates the replicas and their tags given the original file might be insecure since it gives considerable advantage for the provider to misbehave. In this case, the provider, e.g., could only store a single replica and construct the correct response on the fly for all other replicas when triggered by the user.

The solution according to an embodiment of the invention bridges the gap between these two alternatives through the use of non-parallelizable time-lock puzzles A time-lock puzzle is a function f that can be configured to take at least a certain time to compute. Typically, the function cannot be parallelized, so that it cannot significantly profit from additional hardware. According to an embodiment of the invention, the time-lock puzzle can be used during the generation of replicas.

Namely, in an embodiment of the invention, the user can store only his original files, along with the corresponding block authentication tags similar to existing POR/PDP schemes. In addition, the user outsources t compact time-lock puzzles to the cloud provider, each puzzle corresponding to one replica of the file. The puzzles can be constructed in such a way that (i) they require noticeable time to be solved by the cloud provider using modern hardware, e.g. 10-100 seconds, (ii) their solution is or can be used to create a replicated file with the same size of the original file, and (iii) their solution can be efficiently verified by the puzzle creator, typically much faster, e.g. <1 second. The t replicas are given by the solution of the puzzle or can be derived by combining blocks from the original file with each of the t puzzle solutions. Here, an embodiment of the invention ensures that users can leverage the authentication tags created to verify that the cloud provider indeed stores all replicas in a compact challenge-response protocol.

By doing so, an embodiment of the invention guarantees that a cloud provider which does not correctly store the required number of replicas will be detected with overwhelming probability by users. Notably, the puzzle-based construct according to an embodiment of the invention ensures that the time required by the provider to construct the replicas on the fly will be noticeable by users, and will provide evidence that the files are not appropriately replicated. Notice that a malicious provider could compute and store the solution of the t puzzles without effectively replicating files. This strategy is unlikely to be adopted by a rational provider since (i) an embodiment of the invention ensures that each puzzle solution cannot be compressed and has the same size as the original file and (ii) given the puzzle solutions, the computation of the file replicas can be efficiently performed. To do so, an embodiment of the invention leverages the time-lock puzzle by Rivest, see Rivest, R. L., Shamir, A., and Wagner, D. A. Time-lock puzzles and timed-release crypto, Tech. rep., Cambridge, Mass., USA, 1996.

The advantages of using Rivest's time lock puzzle are manyfold, namely:
  This puzzle is based on RSA and exhibits a trapdoor based on the Euler totient function, which enables users to verify the puzzle efficiently, irrespective of the puzzle difficulty.
  Since it is based on RSA, Rivest's puzzle can be easily combined with our homomorphic tags to support batch verification of all replicas.
  Rivest's puzzle is based on modular exponentiation. Modular Multiplication is an inherently sequential process. The running time of the fastest known algorithm for modular exponentiation is linear in the size of the exponent. Although the provider might try to parallelize the computation of the puzzle, the parallelization advantage is expected to be negligible.

Embodiments of the present invention can show the following characteristics:

1) Combining the use of proofs of retrievability schemes with time-lock puzzles to construct proofs of replication schemes where users only upload one replica. 2) Computing proofs of integrity for all replicas in a single and compact challenge-response protocol by leveraging the homomorphic nature of our tags.

An embodiment of a method for storing data in a cloud can comprise the following steps:

For storing files and creating the replicas:

1) Processing the original file according to our solution, creating the authentication tokens, and t puzzle instances.

2) Sending the file, authentication tokens, puzzle instances to the cloud.

3) The cloud stores the file, and computes t solutions for each puzzle instance.

4) The cloud constructs t replicas by combining the t puzzle solutions with the original file.

For verifying the stored file and replicas:

5) The user issues a challenge for blocks contained across all replicas.

6) The cloud computes a response from the challenge, the authentication tags created by the users, and the actual replica blocks that are stored.

7) The user measures the time it takes for the cloud to respond and efficiently verifies the response of the cloud using a trapdoor function to ensure that all replicas are stored.

8) If the response is correctly verified and the response of the cloud takes below a threshold amount of time, the user is convinced that the cloud hosts all the replicas correctly. Otherwise, the user suspects that the cloud is cheating.

Within embodiments of the invention users need to process/upload their original files only once irrespective of the replication undergone by their data; here, conforming with the current cloud model, the cloud provider appropriately constructs the replicas given the original user files and according to some predefined policy. Nevertheless, an embodiment of the invention allows users to efficiently verify the integrity of all data replicas, including those constructed by the service provider. By doing so, the communication costs of existing expensive MRV schemes where users are required to construct and upload the data replicas by themselves are tremendously reduced. Nevertheless, embodiments of the invention provide comparable security to existing provably secure MRV schemes; namely, users of can detect, with overwhelming probability, tampering with any of the replicas of their files.

FIG. 1 shows an embodiment of a method for storing data in a cloud, including storage of a data file with creation of two replicas. A challenge/response protocol is triggered by a user.

FIG. 1 summarizes the main operations and model assumed in embodiments of the invention:
  The user has a file f, computes tags for a proof of retrievability and includes data needed for computing the replicas, i.e. a challenge for a time-lock function.
  The server receives the file, the tags and the replication data and starts to transform the file for the replica storage.
  The user is able to challenge the storage provider to obtain a proof that all replicas are stored.

Further Embodiments

Computing Tags:

To store a file $M \in \{0, 1\}^*$, the file is interpreted as n blocks, each s sectors long, thus there are n*s sectors: $m_{i,j}$ for $1 \leq i \leq n$ and $1 \leq j \leq s$. The user generates an RSA modulus $N=pq$ by generating two primes p, q with a length according to the security parameter.

The user will then proceed to prepare the file by creating tags $\tau$ to produce as follows:

The user samples the values that are necessary for verification. More precisely, the user generates n values of $Z_N$, i.e. $secret_1 \ldots secret_n \leftarrow Z_N$ and s elements of $Z_{\varphi(N)}$, i.e., $\alpha_1, \ldots, \alpha_s \leftarrow Z\varphi(N)$.

Finally, the user computes for each i, $1 \leq i \leq n$:

$$\sigma_i = secret_i * \prod_{j=1 \ldots s} (m_{ij})^{\alpha_j}$$

As an alternative embodiment, the user can compute the tags additively as $$\sigma_i = secret_i + \sum_{j=1 \ldots s} \alpha_j \cdot m_{ij}$$

The user stores $secret_1, \ldots, secret_n, \alpha_1, \ldots, \alpha_s$ and keeps it secret. We define the processed file as the pairs of the file bocks and the tags ($m_{ij}$ $1 \leq j \leq s$, $\sigma_i$ $1 \leq i \leq n$). The processed file is uploaded to the server S.

Creating Replicas:

For creating replicas of the file the user creates a large exponent $E > N$, as an instance of a function that takes a certain time to compute, i.e. a time-lock puzzle. The required time can be adapted by the size of the parameter E.

1. In one embodiment, the users chooses s random numbers $p_1, \ldots, p_s \in Z_N$ for each copy the user would like to have stored. The server S stores the file and the tags and begins now to create the replicas of M to increase the redundancy. The sectors of the replicated copy is produced by multiplying the original sectors with coefficients generated from the RSA time-lock puzzle $m^*_{i,j} = m_{i,j} \cdot p_j^{E^i}$ for $i=1, \ldots, n$, $j=1, \ldots, s$. That is in detail $$M^* = \begin{pmatrix} m_{1,1} \cdot p_1^E & m_{1,2} \cdot p_2^E & \ldots & m_{1,s} \cdot p_s^E \\ m_{2,1} \cdot p_1^{E^2} & m_{2,2} \cdot p_2^{E^2} & \ldots & m_{2,s} \cdot p_s^{E^2} \\ \vdots & \vdots & \ddots & \vdots \\ m_{n,1} \cdot p_1^{E^n} & m_{n,2} \cdot p_2^{E^n} & \ldots & m_{n,s} \cdot p_s^{E^n} \end{pmatrix}$$

2. In another embodiment, the numbers $p_i$ are pairwise different primes.
3. In another embodiment, only the exponent E is used and the message is directly raised to the power E:

$$M^*_k = \begin{pmatrix} m_{1,1}^{E_k} & m_{1,2}^{E_k} & \ldots & m_{1,s}^{E_k} \\ m_{2,1}^{E_k^2} & m_{2,2}^{E_k^2} & \ldots & m_{2,s}^{E_k^2} \\ \vdots & \vdots & \ddots & \vdots \\ m_{n,1}^{E_k^n} & m_{n,2}^{E_k^n} & \ldots & m_{n,s}^{E_k^n} \end{pmatrix}$$

4. In another embodiment, the puzzle is creating a larger vector or matrix than the original file and the replica is constructed by combining multiple entries of the puzzle solution with a sector in the file. One embodiment of this idea is given by a vector with entries $p^{E^i}$ with entries $i=1 \ldots l$, so that the length l is larger than the number of sectors in the file. Then multiple of those entries are combined with a message sector, denoted by a set of indices I.

$$P = (p^E, p^{E^2}, p^{E^3}, p^{E^4}, \ldots, p^{E^l})$$

$$M^* = \begin{pmatrix} m_{1,1} \cdot \prod_{i \in I_{1,1}} p^{E^i} & \ldots & m_{1,s} \cdot \prod_{i \in I_{1,s}} p^{E^i} \\ \vdots & \ddots & \vdots \\ m_{n,1} \cdot \prod_{i \in I_{n,1}} p^{E^i} & \ldots & m_{n,s} \cdot \prod_{i \in I_{n,s}} p^{E^i} \end{pmatrix}$$

5. In another embodiment, the replica is given by a pre-image of the message under a one-way function, i.e. a replica for a sector $m_{ij}$ is given by r such that $H(meta\|r_{ij}) = m_{ij}$. The metadata meta can encode further information, such as the position of the sector in the file.

Verifying Replicas:

For the verification process, the protocol generates a random challenge of the used proof of retrievability scheme of size x.

With the suggested POR: The verifier picks a random x-element subset I of the set of blocks $\{1, \ldots, n\}$, and for each $i \in I$, a random element $v_i \rightarrow Z\varphi(N)$ is sampled. The challenge sent to the server S is the set $\{(i, vi)\}_{i \in I}$ of size x.

The server computes the response for all replicas and transmits it to the user. The response comprises several parts: for the file and each replica of the file and in addition for the tags.

For each replica M*, the server computes a vector $\mu_1, \ldots, \mu_s$ where $\mu_j = \Pi_{k=1}^{x} (m_{i_k,j})^{v_k} \mod N$ For the tags $\sigma = \Pi_{k=1}^{x} (\sigma_{i_k,j})^{v_k} \mod N$ In an alternative embodiment where the tags are created in an additive way, also the response is created additively, i.e. $\mu_j = \Sigma_{k=1}^{x} m_{i_k,j} \cdot v\_k \mod N$ and $\sigma = \Sigma_{k=1}^{x} \backslash sigma_{i_k,j} \cdot v\_k \mod N$.

The user obtains the response and checks if indeed all replicas are stored. The check is made up by computing for each replica $e = v_1 E^{i_1} + \ldots + v_s E^{i_s}$ and $w = \mu_1^{\alpha_1} \cdot \ldots \cdot \mu_s^{\alpha_s} \cdot secret_{i_1}^{v_1} \cdot \ldots \cdot secret_{i_x}^{v_x}$. Depending of the replica algorithm the check is $w = \sigma \cdot \Pi_{i=1}^{s} p_i^{e \cdot \alpha_i}$ in case p was used or $w = \Pi_{i=1}^{e \cdot \alpha_i}$ otherwise The user measures the time it takes the server to compute the response. This time must be smaller than the expected time to compute the puzzle Otherwise, the user will not accept the response.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for storing data in a cloud, the method comprising:
    receiving at least one data file to be stored together with a predefined number t of replicas of the at least one data file within the cloud, at least one authentication tag corresponding to the at least one data file and t functions that are configurable to take at least a predefined time to compute;
    storing the at least one data file within the cloud;
    computing t solutions of the t functions within the cloud;
    generating the t replicas of the at least one data file based on the t solutions of the t functions and the at least one data file within the cloud, wherein each of the t functions is used for at least one of the t replicas of the at least one data file; and
    storing the t replicas within the cloud.

2. The method according to claim 1, wherein the t functions each are not parallelizable and/or comprise an exponent E and/or comprise a one-way function.

3. The method according to claim 1, wherein the t functions are time-lock puzzles.

4. The method according to claim 3, wherein at least one or each of the time-lock puzzles is based on exponentiation modulo a composite number.

5. The method according to claim 3, wherein at least one or each of the time-lock puzzles exhibits a trapdoor based on an Euler totient function.

6. The method according to claim 3, wherein at least one or each of the time-lock puzzles is based on finding a pre-image of a one-way function.

7. The method according to claim 1, wherein each of the t solutions is efficiently verifiable.

8. The method according to claim 1, wherein the receiving includes receiving a processed file comprising the at least one data file and the at least one authentication tag.

9. The method according to claim 1, further including receiving a challenge issued for blocks contained across all of the t replicas.

10. The method according to claim 9, further including computing a response to the challenge under consideration of the at least one authentication tag and the at least one data file and the t replicas stored.

11. A method for storing data to a cloud, the method comprising:
    providing at least one data file to be stored together with a predefined number t of replicas of the at least one data file within the cloud, at least one authentication tag corresponding to the at least one data file and t functions that are configurable to take at least a predefined time to compute; and
    transmitting the at least one data file, the at least one authentication tag and the t functions to a cloud storage service, to enable the cloud storage service to:
    store the at least one data file within the cloud;
    compute t solutions of the t functions within the cloud;
    generate the t replicas of the at least one data file based on the t solutions of the t functions and the at least one data file within the cloud, wherein each of the t functions is used for at least one of the t replicas of the at least one data file; and
    store the t replicas within the cloud.

12. The method according to claim 11, wherein the t functions each are not parallelizable and/or comprise an exponent E and/or comprise a one-way function.

13. The method according to claim 11, wherein the t functions are time-lock puzzles.

14. The method according to claim 13, wherein at least one or each of the time-lock puzzles is based on exponentiation modulo a composite number.

15. The method according to claim 13, wherein at least one or each of the time-lock puzzles exhibits a trapdoor based on an Euler totient function.

16. The method according to claim 13, wherein at least one or each of the time-lock puzzles is based on finding a pre-image of a one-way function.

17. The method according to claim 11, wherein each of the t solutions is efficiently verifiable.

18. The method according to claim 11, wherein the transmitting includes transmitting a processed file comprising the at least one data file and the at least one authentication tag.

19. The method according to claim 11, further including issuing a challenge for blocks contained across all of the t replicas.

20. The method according to claim 19, further including receiving a response to the challenge, computed under consideration of the at least one authentication tag and the at least one data file and the t replicas stored.

* * * * *